(12) United States Patent
Nguyen et al.

(10) Patent No.: US 9,826,044 B2
(45) Date of Patent: Nov. 21, 2017

(54) PEER-TO-PEER COMMUNICATION FOR SYMMETRIC NAT

(71) Applicant: QUALCOMM Incorporated, San Diego, CA (US)

(72) Inventors: Phil Tien Nguyen, San Diego, CA (US); Lin Zou, San Diego, CA (US); Padmapriya Narayanan, Bellevue, WA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 14/520,327

(22) Filed: Oct. 21, 2014

(65) Prior Publication Data

US 2015/0113154 A1 Apr. 23, 2015

Related U.S. Application Data

(60) Provisional application No. 61/894,845, filed on Oct. 23, 2013, provisional application No. 61/894,852, filed on Oct. 23, 2013.

(51) Int. Cl.
*H04L 29/08* (2006.01)
*H04L 29/12* (2006.01)

(52) U.S. Cl.
CPC .......... *H04L 67/141* (2013.01); *H04L 61/256* (2013.01); *H04L 61/2575* (2013.01);
(Continued)

(58) Field of Classification Search
CPC ...................................................... H04L 61/25
See application file for complete search history.

(56) References Cited

U.S. PATENT DOCUMENTS 7,620,033 B2 11/2009 Chu et al.
7,684,397 B2 3/2010 Kim et al.
(Continued)

FOREIGN PATENT DOCUMENTS

WO 2011035528 A1 3/2011
WO 2013067870 A1 5/2013

OTHER PUBLICATIONS

International Search Report and Written Opinion—PCT/US2014/061961—ISA/EPO—Jan. 27, 2015.
(Continued)

*Primary Examiner* — Shirley Zhang
(74) *Attorney, Agent, or Firm* — MG-IP Law, P.C.

(57) ABSTRACT

Systems and methods for communicating between a first and a second peer using interactive connectivity establishment (ICE) protocol, the first and second peers sharing a symmetric network address translation (NAT) having wireless isolation enabled and no support for hair-pinning. At a first Traversal Using Relay NAT (TURN) server designated as a relay candidate by a TURN Virtual Internet Platform (VIP), it is determined that a first port allocated by the symmetric NAT for a first request for communication initiated by the first peer and directed to the TURN VIP, is different from a second port allocated by the symmetric NAT for a first packet transmitted from the first peer to the first TURN server, based on a first indication. The second port is mapped to the first port. Using a similar port mapping for the second peer, peer-to-peer communication between the first and second peers is enabled.

16 Claims, 3 Drawing Sheets

(52) U.S. Cl.
CPC ........ *H04L 61/2589* (2013.01); *H04L 67/104* (2013.01); *H04L 67/16* (2013.01)

(56) References Cited

U.S. PATENT DOCUMENTS

| | | | | |
|---|---|---|---|---|
| 8,055,771 | B2* | 11/2011 | Shen | H04L 29/12528 370/259 |
| 8,060,626 | B2* | 11/2011 | Roy | H04L 29/1249 709/228 |
| 8,224,985 | B2 | 7/2012 | Takeda | |
| 8,374,188 | B2 | 2/2013 | Yahyaoui et al. | |
| 8,917,311 | B1* | 12/2014 | Yang | H04L 65/1069 348/14.01 |
| 9,497,160 | B1* | 11/2016 | Diffie | H04L 61/2521 |
| 2010/0257276 | A1 | 10/2010 | Savolainen | |
| 2011/0231917 | A1* | 9/2011 | Chaturvedi | H04L 29/08846 726/8 |
| 2012/0099599 | A1 | 4/2012 | Keraenen et al. | |
| 2015/0120918 | A1* | 4/2015 | Takeda | H04L 29/12528 709/224 |
| 2015/0304276 | A1* | 10/2015 | Chen | H04L 61/2582 370/352 |
| 2016/0094586 | A1* | 3/2016 | Gunnalan | H04L 45/123 709/228 |

OTHER PUBLICATIONS

Rosenberg J., et al., RFC 5389—Session Traversal Utilities for NAT (STUN) 11, Oct. 30, 2008, [retrieved on Dec. 8, 2014], pp. 1-51, XP055157314, Retrieved from the Internet: URL:http://tools.ietf.org/html/rfc5389.

Rosenberg J., et al., "Traversal Using Relays Around Nat (Turn): Relay Extensions To Session Traversal Utilities for Nat (Stun); rfc5766.Txt," Traversal Using Relays Around NAT (Turn): Relay Extensions to Session Traversal Utilities for Nat (Stun); Rfc5766. Txt, Internet Engineering Task Force, i ETF; Standard, Internet Society (ISOC) 4, Rue Des Falaises Ch-1205 Geneva, Switzerland, Apr. 29, 2010, pp. 1-67, XP015070780.

Many R., et al., "Traversal Using Relays around NAT (TURN): Relay Extensions to Session Traversal Utilities for NAT (STUN) (RFC5766)," Internet Society Request for Comments, Apr. 1, 2010, pp. 6.

Perreault S., et al.., "Traversal Using Relays around NAT (TURN) Extensions for TCP Allocations (RFC6062)," Internet Society Request for Comments, Nov. 1, 2010, pp. 6.

Wang X., et al., "VIP: A P2P Communication Platform for NAT Traversal," Third International Symposium ISPA, Parallel and Distributed Processing and Applications, Lecture Notes in Computer Science, Nov. 2005, pp. 6, vol. 3758.

* cited by examiner

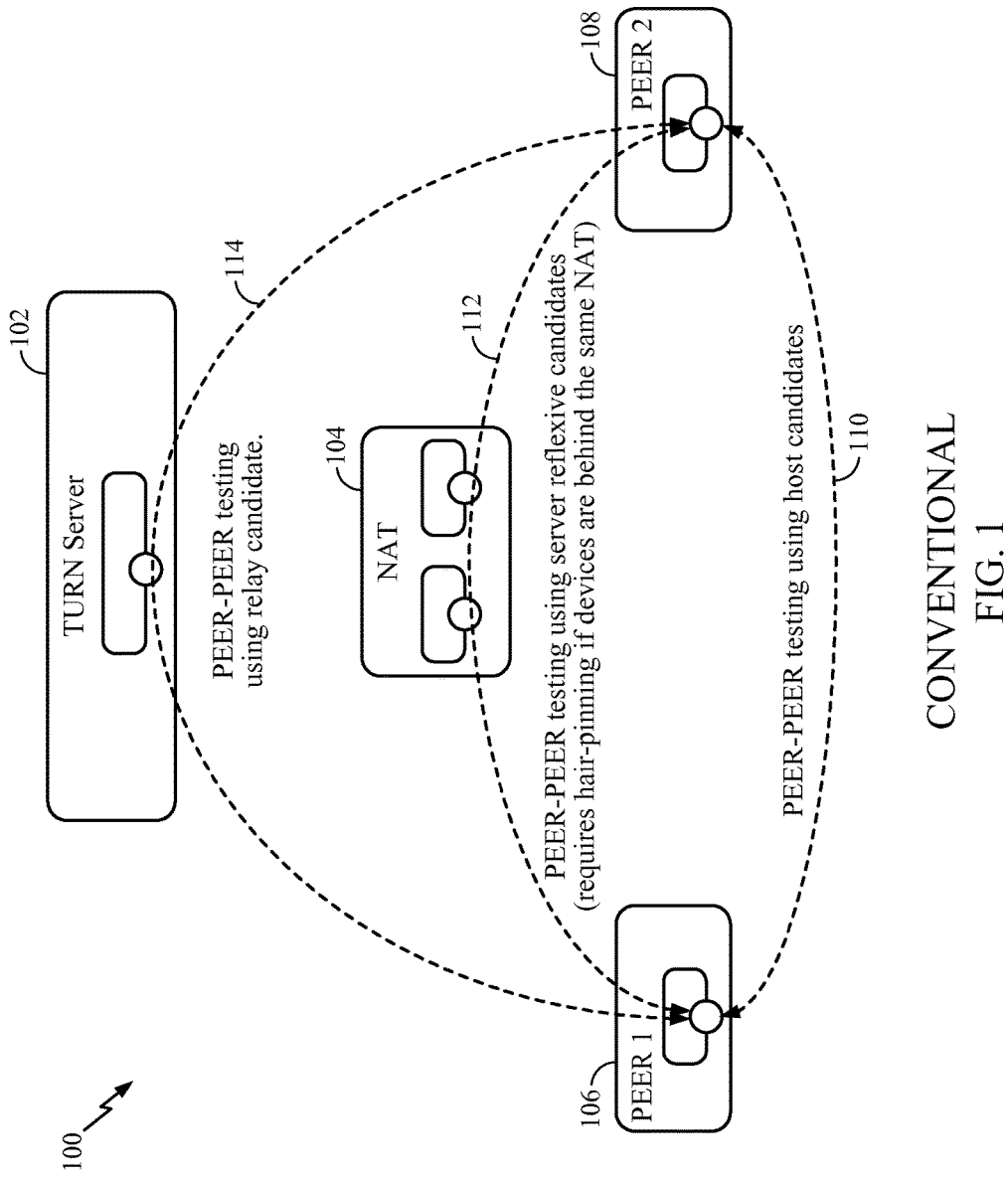
CONVENTIONAL
FIG. 1

PEER-TO-PEER COMMUNICATION FOR SYMMETRIC NAT

CLAIM OF PRIORITY UNDER 35 U.S.C. §119

The present application for patent claims the benefit of Provisional Patent Application No. 61/894,845 entitled "PEER-TO-PEER COMMUNICATION FOR SYMMETRIC NAT" filed Oct. 23, 2013, and assigned to the assignee hereof and hereby expressly incorporated herein by reference in its entirety. The present application for patent also claims the benefit of Provisional Patent Application No. 61/894,852 entitled "PEER-TO-PEER COMMUNICATION FOR SYMMETRIC NAT" filed Oct. 23, 2013, and assigned to the assignee hereof and hereby expressly incorporated herein by reference in its entirety.

FIELD OF THE DISCLOSURE

Disclosed embodiments are directed to peer-to-peer communication. More particularly, exemplary aspects relate to peer-to-peer communication between two peers based on interactive connectivity establishment (ICE) protocol where the two peers are behind a symmetric network address translation (NAT) with wireless isolation enabled and no support for hair-pinning.

BACKGROUND OF THE INVENTION

The Internet is a global system of interconnected computers and computer networks that use a standard Internet protocol suite (e.g., the Transmission Control Protocol (TCP) and Internet Protocol (IP)) to communicate with each other. An Internet Protocol address (IP address) is a numerical label assigned to each device (e.g., computer, printer) participating in a computer network that uses the Internet Protocol for communication. The Internet Assigned Numbers Authority (IANA) manages the IP address space allocations globally and delegates five regional Internet registries (RIRs) to allocate IP address blocks to local Internet registries, such as, Internet service providers (ISPs), and other entities. Traditionally, an IP address has been defined as a 32-bit number, and a conventional system using 32-bit IP addresses is known to follow an IP version 4 (IPv4) protocol. However, due to the explosion of the number of devices connected to the Internet in the past years, the 32-bit IP address space has been depleted and several mechanisms are in place to combat this problem.

Rather than assign unique IP addresses to each device connected to the Internet, private networks consisting of two or more computers or devices have been developed, where a public face of the private network can be assigned a public or global IP address, whereas the devices within the private network need not have uniquely assigned IP addresses in the global sense. In other words, the private networks can manage any suitable addressing mechanism for devices within the network, and the private addresses for the devices are not routed directly on to the Internet. For example, devices within the private network can have private addresses that need not be coordinated with a global IP address registry or ISP, but these devices can communicate with one another, within the private network, through TCP/IP protocol. However the devices within the private network may often need to be protected for security concerns and these devices may be prevented from directly connecting to the Internet. The private addresses within a private network are not made globally visible through the Internet.

A network address translator (NAT) is a well known device or mechanism used in interfaces between private networks and the Internet. NATs can be used to initiate connections from within a private network to the Internet, but they hide the private network addresses behind public IP addresses. For example, a NAT performs modifications to addresses associated with data traversing the private network/global Internet boundary and maps the IP address from the private IP address to public IP address and vice versa. This enables communication between the devices within the private network and the Internet, while masking or hiding the private IP addresses.

In practice, the devices typically communicate with the Internet using a user datagram protocol (UDP). UDP uses a simple transmission model with no handshaking dialogues. The devices or computer applications can send "datagrams" or packets to other hosts on the private or public IP networks without requiring prior communications to set up special transmission channels or data paths. For outbound packets sent from the devices within the private network to the Internet, the NAT allocates temporary port numbers, wherein the temporary port numbers are correspondingly mapped to the devices which send the outbound packets. The NAT retains the mapping for a predetermined period of time, which is also known as a duration of flow. When inbound packets are received from the Internet, the inbound packets include the allocated port numbers to identify the destination device within the private network. The NAT uses the mapping to forward the inbound packets to the device in the private network that corresponds to the port number included in the inbound packet. In this manner, the private addresses of the devices within the private network are hidden from the Internet by means of the NAT.

The NAT can provide an effective solution for typical client-server communications, such as, browsing the worldwide web or accessing email, since it is the client or host (e.g., a device within the private network) that would initiate such a communication with an Internet server outside the private network, and the connection through the NAT would not need to be maintained for a long time. However, for communication between two clients or hosts within the private network, also known as peer-to-peer communication (e.g., a voice over IP or "VoIP" communication) a conventional NAT implementation would give rise to several problems.

In peer-to-peer communications such as, VoIP, the goal is to have audio and/or video data or packets flow directly between the two peers or clients. Such direct flows in peer-to-peer communications would eliminate the need for relaying agents, which is desirable because relaying agents add cost, consume bandwidth and introduce latency. In order to perform a VoIP communication, each client would need to inform its address to the other client by sending the respective addresses over the VoIP signaling path. When a NAT is present, and a first client attempts to send its private address to a second client for a VoIP communication with the second client, the NAT would assign a first port number to the first client for the outbound packet containing the first client's private address. When the second client receives the packet, obtains the first client's private address and attempts to send data (audio/video) back to the first client's private address, this would not be successful, because the NAT would only recognize the first port number, not the first client's private address, for inbound packets to the first client.

Some NATs can support a so called hair-pin feature, whereby the NAT can forward packets from the first client to the second client when both clients are within the same private network. When hair-pinning is supported, the NAT can detect that the public IP address destination of the outbound packet from the first client is a mapped IP address that was created for the second client by the NAT. Thus, the NAT is able to use hair-pinning to forward packets correctly in order to support peer-to-peer communication between the two clients when they are both located within the same NAT's private network. While this is a desirable feature, it is not commonly implemented by NATs, particularly in commercial deployments. For example, in a coffee shop or other commercial establishments which feature WiFi access to its customers, a commercial NAT may be deployed for the establishment's private network. Allowing or implementing hair-pinning would allow random or unauthorized users of the private network to discover other users or user devices using hair-pinning. This is undesirable from a privacy and security perspective. Therefore, hair-pinning is not a commonly supported feature, particularly in commercial settings.

When hair-pinning is not an option, a traditional approach for NAT traversal involves a session traversal utilities for NAT (STUN). STUN offers a mechanism by which the first client can discover the presence of the NAT and also obtain a public IP address and port number of the first client that were mapped by the NAT. STUN requires assistance from a third-party server called a STUN server which is located on the public side of the NAT. The first client can find out its public IP address and port by querying the STUN server, and then send this public IP address instead of its private address to the second client. The second client can also similarly discover and send its public IP address to the first client. The two clients can then send data packets to the respective other client's public IP address in order to perform the peer-to-peer communication, such as VoIP communication, with each other. This mechanism of NAT traversal using a STUN server is also known in the art as punching a hole in the NAT. However, traditional STUN based approaches are insufficient for all types of NATs. For example, they would fail for symmetric NATs and port restricted NATs.

A symmetric NAT is among the most challenging, when it comes to NAT traversal. A symmetric NAT allocates different mappings of the same client within the private network (e.g., the first client) for communications to the STUN server and communications with other external hosts such as Internet servers. Accordingly, the IP address and port that is obtained by the first client from the STUN server and passed on to the second client for peer-to-peer communication is rendered meaningless, because the IP address and port number from the STUN server are different from the IP address and port mapping that the NAT creates for the peer-to-peer communication. Thus, when the second client tries to send a packet to the STUN based IP address of the first client, the NAT would drop the packet. A symmetric NAT is commonly employed, for example in commercial settings (where hair-pinning support is typically missing), and thus, yet other solutions are commonly employed in this space.

A currently outdated method, namely, traversal using relay NAT (or the "old TURN") involves a method of overcoming the shortcomings of STUN with regard to traversal of symmetric NATs. According to old TURN, STUN would be used to detect the NAT type, and when a symmetric NAT type is discovered, the old TURN would be used as a relay. However, this straightforward approach turned out to be unreliable, and a new TURN is now in place. The new TURN (or simply, "TURN," hereafter) pertains to traversal using relay around NAT. The TURN protocol will be described with reference to FIG. 1 below.

In FIG. 1, a conventional communication system 100 is illustrated, wherein a TURN protocol is deployed. System 100 comprises TURN server 102, which is located on the public side of NAT 104. In one example, NAT 104 can be a symmetric NAT. In this case, first and second clients, peer-1 106 and peer-2 108 would be behind the same symmetric NAT, NAT 104. The symmetric NAT and STUN would not provide a path for the purported peer-to-peer communication between peer-1 106 and peer-2 108. TURN server 102 would provide such a path by acting as a relay. The requests for communication from the clients behind NAT 104 will be forwarded through NAT 104 to TURN server 102. TURN server 102 would then allocate, for example, a first TURN address for peer-1 106 when peer-1 106 contacts TURN server 102 to establish a peer-to-peer communication with peer-2 108. TURN server 102 would do the same for peer-2 108, in that TURN server 102 would create a second TURN address for peer-2 108 when peer-2 108 contacts TURN server 102. TURN server 102 would act as a relay, and peer-1 106 and peer-2 108 would communicate through TURN server 102 using the first and second TURN addresses. Thus, the TURN protocol maintains security and also allows for communication to take place where symmetric NAT and traditional STUN may fail. However, the use of TURN servers is expensive, and the use of TURN servers for communication must be limited to a last resort, for example, when NAT and STUN would not work (e.g., in the case of the symmetric NAT situation).

Commercial TURN deployments typically have multiple TURN servers and a TURN virtual intranet platform (VIP) is used for balancing load among the multiple TURN servers.

An interactive connectivity establishment (ICE) protocol involves a NAT traversal technique that is used to find the best path for peer-to-peer communication between two clients which are behind the same NAT (ICE can also be employed when different NATs are involved). For example, referring back to FIG. 1, several paths for peer-to-peer communication can potentially exist between first and second clients, peer-1 106 and peer-2 108. A first possible path, path 110 is a direct path between the two clients, which may, for example, be through UDP sockets on the two clients. A Bluetooth communication between two Bluetooth enabled devices can constitute one example of a path similar to path 110. A second possible path, path 112 can be through NAT 104. More specifically, a socket can be created on NAT 104 that is mapped to each of the two clients, and in this case, NAT 104 is also known as a server reflexive candidate. The third possible path, path 114 is through a dedicated socket which is created on TURN server 102, where TURN server 102 is a relay candidate. ICE can determine, for example, based on performing a series of checks, the best option between paths 110-114, for example, based on the availabilities, specifications and requirements of system 100. The selected path will then be used for peer-to-peer communication between the two clients.

However, there remain situations where the conventional techniques known in the art are insufficient to establish peer-to-peer communication between two clients. For example, a symmetric NAT may further have a feature to enable wireless isolation, or in other words, the symmetric NAT would disallow wireless devices connected to the private network behind the symmetric NAT to access one another through the wireless network. This is again commonly seen, for example, in commercial establishments which offer WiFi or wireless network access to customers, to ensure that one user of the network cannot access another user's device in an unintended or unauthorized manner over the wireless network. Additionally, the typical case would involve a symmetric NAT, lack of support for hair-pinning, and a TURN VIP to balance load among multiple TURN servers. In this situation, conventional ICE implementations cannot provide or establish any means of peer-to-peer communication between two clients behind the symmetric NAT with wireless isolation enabled and without support for hair-pinning.

Accordingly, there is a need in the art for configurations which enable peer-to-peer communication between two clients behind a same symmetric NAT, where the symmetric NAT has wireless isolation enabled and no support for hair-pinning, and where a TURN VIP is configured to balance load amongst multiple TURN servers associated with the symmetric NAT.

SUMMARY

Exemplary embodiments include systems and methods for peer-to-peer communication between two peers based on interactive connectivity establishment (ICE) protocol where the two peers are behind a symmetric network address translation (NAT) with wireless isolation enabled and no support for hair-pinning.

Accordingly, an exemplary aspect includes a method of communicating between a first peer and a second peer using interactive connectivity establishment (ICE) protocol, the method comprising: sharing a symmetric network address translation (NAT) between the first peer and the second peer, the symmetric NAT having wireless isolation enabled and no support for hair-pinning. The method includes determining, at a first Traversal Using Relay NAT (TURN) server designated as a relay candidate by a TURN Virtual Internet Platform (VIP), that a first port allocated by the symmetric NAT for a first request for communication initiated by the first peer, the first request directed to the TURN VIP, is different from a second port allocated by the symmetric NAT for a first packet transmitted from the first peer to the first TURN server, based on a first indication, and performing a first mapping of the second port to the first port at the first TURN server.

In exemplary aspects, the first indication can include a first attribute inserted in the first packet transmitted from the first peer. In further aspects the method can also include determining, at the first TURN server, that a third port allocated by the symmetric NAT for a second request for communication initiated by the second peer, the second request directed to the TURN VIP, is different from a fourth port allocated by the symmetric NAT for a second packet transmitted from the second peer to the first TURN server, based on a second indication, and performing a second mapping of the fourth port to the third port at the first TURN server. The second indication can similarly include a second attribute inserted in the second packet transmitted from the second peer. Accordingly, peer-to-peer communication between the first peer and the second peer can be performed based on the first mapping and the second mapping.

In exemplary aspects, the first TURN server can be selected from the first TURN server and a second TURN server by the TURN VIP, based on balancing load at the TURN VIP. Moreover, the first packet and second packet can be Simple Traversal of User Datagram Protocol (STUN) packets.

Another exemplary aspect can include a communication system comprising a first peer and a second peer. A symmetric network address translation (NAT) is shared between the first peer and the second peer, the symmetric NAT having wireless isolation enabled and no support for hair-pinning. The communication system includes a TURN Virtual Internet Platform (VIP) and a first Traversal Using Relay NAT (TURN) server designated as a relay candidate by the TURN Virtual Internet Platform (VIP). The first TURN server is configured to determine that a first port allocated by the symmetric NAT for a first request for communication initiated by the first peer, the first request directed to the TURN VIP, is different from a second port allocated by the symmetric NAT for a first packet transmitted from the first peer to the first TURN server, based on a first indication, and perform a first mapping of the second port to the first port.

Yet another exemplary aspect relates to a system comprising: a first peer, a second peer, and a symmetric network address translation (NAT) shared between the first peer and the second peer, the symmetric NAT having wireless isolation enabled and no support for hair-pinning. The system includes means for communicating between the first peer and the second peer based on interactive connectivity establishment (ICE) protocol. The means for communicating comprises: means for determining that a first port allocated by the symmetric NAT for a first request for communication initiated by the first peer is different from a second port allocated by the symmetric NAT for a first packet transmitted from the first peer, based on a first indication, and means for performing a first mapping of the second port to the first port.

BRIEF DESCRIPTION OF THE DRAWINGS

The accompanying drawings are presented to aid in the description of embodiments of the invention and are provided solely for illustration of the embodiments and not limitation thereof.

FIG. 1 illustrates a conventional communication system with a TURN server deployment.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are configured to overcome the aforementioned limitations of existing techniques in order to enable peer-to-peer communication between two clients behind a symmetric NAT with wireless isolation enabled and no support for hair-pinning. Exemplary solutions are compatible with commercial TURN deployments which typically have a TURN VIP for balancing load among multiple TURN servers.

Figure 2:
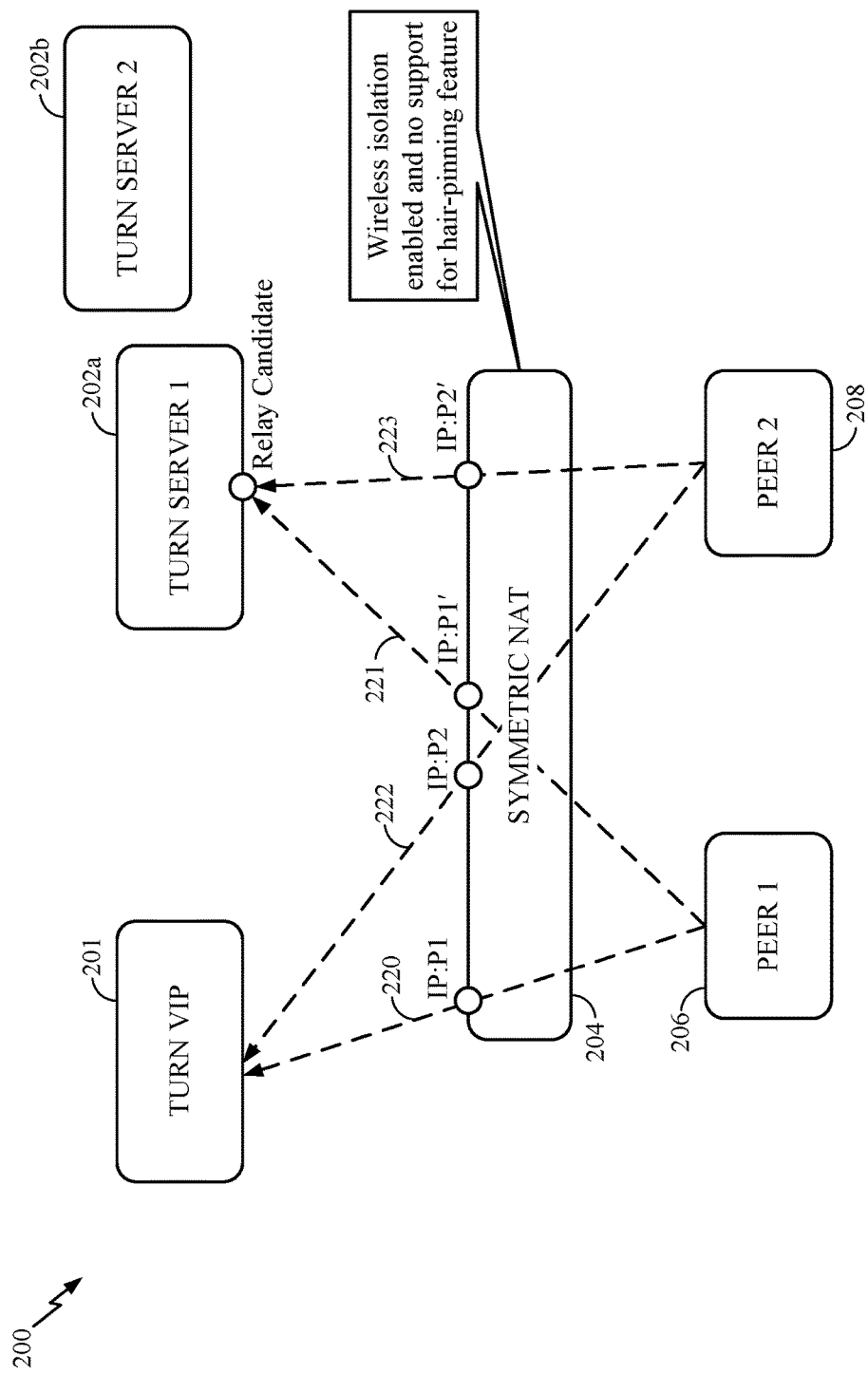
FIG. 2 illustrates a commercial TURN deployment where exemplary aspects are configured.

With reference now to FIG. 2, exemplary communication system 200 configured according to aspects of this disclosure is illustrated. System 200 includes TURN VIP 201, which can be configured to balance load between two or more TURN servers, such as TURN server-1 202a, TURN server-2 202b, etc. Symmetric NAT 204 has wireless isolation enabled and no support for hair-pinning First and second clients, peer-1 206 and peer-2 208 are behind symmetric NAT 204, or in other words, belong to a private network which connects to the Internet (not shown) through symmetric NAT 204. In an example, symmetric NAT 204 would constitute the server reflexive candidate; and TURN server-1 202a can be selected by TURN VIP 201 as the relay candidate.

In an example, peer-1 206 intends to establish a peer-to-peer communication, such as a VoIP communication, with peer-2 208. Under an ICE protocol, a device, such as peer-1 206 or peer-2 208, intending to establish such communication would first interact with TURN VIP 201 to discover the server reflexive and relay candidates for the intended communication. In this example, the server reflexive candidate that will be discovered using TURN VIP 201 will correspond to symmetric NAT 204. The relay candidate that will be discovered by TURN VIP 201 will be TURN server-1 202a. In the deployment of system 200 that has been depicted in FIG. 2, which may correspond to a commercial deployment, for example, TURN VIP 201 and the two TURN servers 202a and 202b will have different IP addresses (i.e., the TURN VIP and TURN servers 202a and 202b are not located in a same TURN server box with a common IP address). Because of the previously discussed property of symmetric NATs related to allocating a different port for each source-destination pair seen by the symmetric NAT, the intended peer-to-peer communication will hit a road block in conventional settings using ICE. This roadblock will be further explained in detail below, followed by exemplary aspects that overcome the roadblock and enable peer-1 206 or peer-2 208 to establish the intended peer-to-peer communication.

With continuing reference to FIG. 2, the port assigned to the server reflexive candidate, symmetric NAT 204, discovered using TURN VIP 201 when peer-1 206 attempts the subject peer-to-peer communication is port IP: P1 220. Similarly, if peer-2 208 attempts a peer-to-peer communication with peer-1 206, TURN VIP 201 would discover the same server reflexive candidate, symmetric NAT 204. The port that would be assigned to peer-2 208 for intended communication with peer-1 206 would be port IP: P2 222.

The ICE protocol would then proceed to perform a series of checks to determine the most suitable communication path for the intended peer-to-peer communication between peer-1 206 and peer-2 208. In this process, ICE would not recognize the path through the server reflexive candidate or symmetric NAT 204 (e.g., path 112 of FIG. 1) as suitable because it is a symmetric NAT which has wireless isolation enabled and no support for hair-pinning. A direct path such as path 110 of FIG. 1 between peer-1 206 and peer-2 208 would also not be possible, for example, in scenarios which can relate to the commercial deployment of FIG. 2. The only set of ICE checks that may reveal a possibility of a potential communication path would be the one through the relay candidate, which in this case would be identified as TURN server-1 202a by TURN VIP 201.

However, under conventional implementations, a path through TURN server-1 202a as a relay candidate would also fail. This is because TURN server-1 202a has a different IP address from that of TURN VIP 201, as previously mentioned. In other words, TURN server-1 202a and TURN VIP 201 will be identified as different destinations by symmetric NAT 204. As previously discussed, symmetric NAT 204 allocates different ports to each source-destination pair. This means that when the two clients, peer-1 206 and peer-2 208 attempt to send out packets for the intended peer-to-peer communication to the designated relay candidate, TURN server-1 202a, different ports, ports IP: P1' 221 and IP: P2' 223, will be assigned for the two clients. These ports are different from the previously assigned ports for the two clients based on the initial contact with TURN VIP 201, i.e., IP: P1 220 and IP: P2 222, respectively. Accordingly, TURN server-1 202a will see the packets for peer-1 206 coming from a different port IP: P1' 221, for example. However, TURN server-1 202a will be unaware of the context that was established previously through port IP: P1 220 with TURN VIP 201. In other words, TURN server-1 202a will not understand that these packets from port IP:P1' 221 relate to the same peer-to-peer communication which was initiated through port IP: P1 220. Moreover, the packets from peer-1 206 will specify that the intended destination relates to the previously established port IP: P2 222 for peer-2 208, and TURN server-1 202a would not be able to recognize port IP: P2 222, as it is only aware of port IP: P2' 223 as pertaining to peer-2 208. Accordingly, TURN server-1 202a, not knowing how to route the packets, will drop the packets. Thus, the intended peer-to-peer communication between the two clients will hit a roadblock, and be unable to proceed in conventional settings. Exemplary aspects of this disclosure relate to overcoming this road block in order to enable the intended peer-to-peer communication between peer-1 206 and peer-2 208. Particularly, at the server side, exemplary aspects relate to configuring TURN server-1 202a, for example, such that peer-to-peer communication between peer-1 206 and peer-2 208 can be enabled.

In at least one exemplary aspect, an indication of a first or initial port allocated to a request from a first peer, by a symmetric NAT, is used for communication of a second peer with the first peer. The indication may be based on an attribute which is inserted in the packets transmitted by the peers. The attribute includes values which can be used to map the different ports created for different destinations of a same source. Using this mapping, the confusion between packets with different port numbers, but pertaining to the same communication, can be resolved.

In one aspect related to communication initiated by peer-1 206, for example, an indication of a first or initial port, based on a first attribute will enable a mapping between the initial port allocated by symmetric NAT 204 for the initial communication with TURN VIP 201 to the different port allocated by symmetric NAT 204 once TURN server-1 202a has been designated as the relay candidate by TURN VIP 201. Accordingly, in one example, the value of the first attribute will be set to the initial port, port IP: P1 220. The indication of the first port, using the first attribute, will be included in one or more packets sent from peer-1 206 to TURN server-1 202a. The port allocated to these packets is port IP: P1' 221. Thus, the value of the first attribute would differ from the port or source address for these packets. This technique would enable the mapping between the two ports, where the mapping can be performed at a server side, such as, in TURN server-1 202a. Thus, in general, if the value of an attribute included in a packet differs from the port allocated to the packet, then the value of the attribute can be associated with the source address for the packet (e.g., peer-1 206, in the above example).

As noted above, the association between the attribute and the source address can be performed at a server side, for example, at TURN server-1 202a. In this example, TURN VIP 201 may have identified TURN server-1 202a as the relay candidate. When peer-1 206 sends out a first packet to the identified relay candidate, TURN server-1 202a, for the peer-to-peer communication with peer-2 208, an indication of the first port, for example, using the first attribute, will be inserted in the first packet. Once again, symmetric NAT 204 will allocate port IP: P1' 221 for the first packet. When TURN server-1 202a receives the first packet, TURN server-1 202a will observe that the source of the first packet (i.e., port IP: P1' 221) is different from the source identified by the first attribute (i.e., port IP: P1 220). This observation will cause TURN server-1 202a to conclude that the two sources are in fact the same, i.e., peer-1 206 in this case. TURN server-1 202a will associate or equate port IP: P1' 221 to port IP: P1 220 for future communications.

In like manner, for peer-2 208, one or more packets following an initial communication packet for a communication initiated with TURN VIP 201 will also include an indication, for example, using a second attribute, whose value includes the initial port created for the initial communication packet from peer-2 208, e.g., port IP: P2 222. These one or more packets will be allocated a different port (i.e., port IP: P2' 223) related to communication with TURN server-1 202a, which has been designated as the relay candidate. Thus, if the value of the second attribute in a second packet, transmitted from peer-2 208 to TURN server-1 202a, is different from the port allocated to the second packet, then the value of the second attribute will be mapped to the port allocated to the second packet. Thus, both ports, port IP: P2 222 and port IP: P2' 223 will be mapped to the same source, peer-2 208.

Once again, TURN server-1 202a will observe that the source of the second packet (i.e., port IP: P2' 223) is different from the source indicated by the second attribute (i.e., port IP: P2 222). TURN server-1 202a will then conclude that port IP: P2' 223 is the same as port IP: P2 222 for future communications related to peer-2 208.

Peer-to-peer communication between peer-1 206 and peer-2 208 can proceed based on the above association or mapping for peer-1 206 and peer-2 208 because the confusion between different ports allocated for the same source will be overcome. TURN server-1 202a can successfully act as a relay for the peer-to-peer communication between peer-1 206 and peer-2 208. In other words, revisiting the first packet sent from peer-1 206 to TURN server-1 202a, the first packet will appear from port IP: P1' 221 and also contain a destination address related to peer-2 208. This destination address will indicate port IP: P2 222 as the address of peer-2 208, based on the initial allocation. However, since the first packet will also contain the first attribute, TURN server-1 202a will be able to determine that the first packet originated from peer-1 206 and is intended for peer-2 208, as it has both address mappings for peer-1 206 (port IP: P1 220=port IP: P1' 221) and peer-2 208 (port IP: P2 222=port IP: P2' 223). The converse case for the second packet from peer-2 208 intended for peer-1 206 will also be similarly handled.

In this manner, in exemplary aspects the roadblock, created due to different ports created by symmetric NAT 204 for TURN VIP 201 and TURN server-1 202a for each client involved in a peer-to-peer communication where symmetric NAT 204 has wireless isolation enabled and no support for hair-pinning, is overcome. In some implementations, it may be sufficient to have the attribute included in only the first packet sent out by the clients to the identified TURN server, i.e., TURN server-1 202a in this example. This may be sufficient to establish the mapping to the initial ports created for communication with TURN VIP 201. Accordingly, subsequent packets may not need to include the attribute.

It will be understood that a similar process as outlined above, can be followed if TURN VIP 201 identifies any other TURN server, such as, TURN server-2 202b as the relay candidate.

In some implementations, the packets (e.g., the first and second packets, and any future packets involved in the subject peer-to-peer communication) can follow standards related to the aforementioned STUN protocol, and may also be referred to as STUN packets. The STUN packets may follow the formats and specifications defined by the Internet Engineering Task Force (IETF) in pertinent sections of RFC 5245, for example. Conventional attributes for STUN packets are defined in those sections. In exemplary aspects, the exemplary attribute discussed above can be included in addition to these conventional attributes. Thus, some aspects relate to improving conventional ICE protocols in order to support and enable peer-to-peer communication where conventional techniques will fail.

In some implementations, one or both of the two clients, peer-1 206 and peer-2 208, can be computers or processing devices. They may also be "Internet of Things" (IoT) devices. The IoT is based on the idea that everyday objects, not just computers and computer networks, can be readable, recognizable, locatable, addressable, and controllable via an IoT communications network (e.g., an ad-hoc system or the Internet). As used herein, the term "Internet of Things device" (or "IoT device") may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like.

Figure 3:
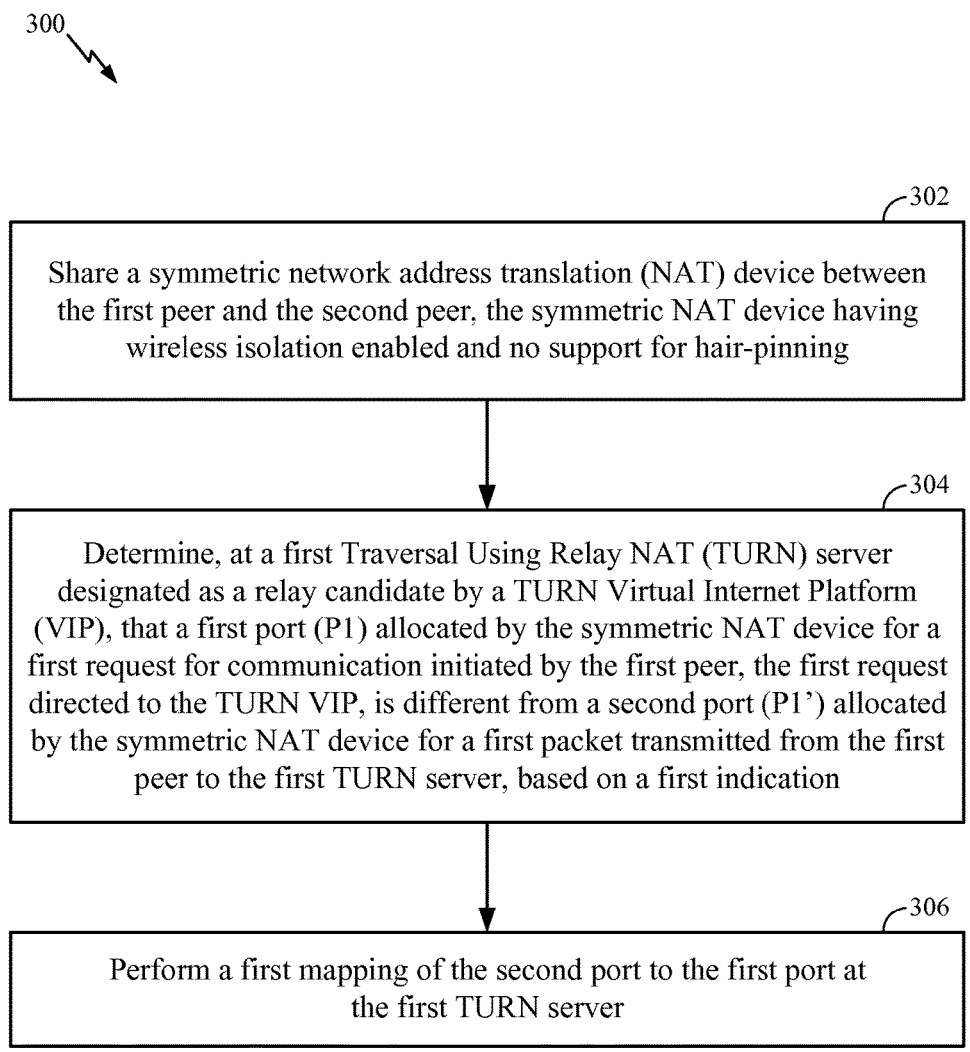
FIG. 3 illustrates a process flow for establishing peer-to-peer communication based on exemplary embodiments.

It will be appreciated that aspects include various methods for performing the processes, functions and/or algorithms disclosed herein. For example, as illustrated in FIG. 3, an exemplary aspect can include a method (300) of communicating between a first peer and a second peer (e.g., peer-1 206 and peer-2 208) using interactive connectivity establishment (ICE) protocol, the method comprising: sharing a symmetric network address translation (NAT) (e.g., symmetric NAT 204) between the first peer and the second peer, the symmetric NAT having wireless isolation enabled and no support for hair-pinning—Block 302; determining, at a first Traversal Using Relay NAT (TURN) server (e.g., TURN server-1 202a) designated as a relay candidate by a TURN Virtual Internet Platform (VIP) (e.g., TURN VIP 201), that a first port (e.g., port IP:P1 220) allocated by the symmetric NAT for a first request for communication initiated by the first peer, the first request directed to the TURN VIP, is different from a second port (e.g., port IP:P1' 221) allocated by the symmetric NAT for a first packet transmitted from the first peer to the first TURN server, based on a first indication—Block 304; and performing a first mapping of the second port to the first port at the first TURN server—Block 306.

As previously explained, the first indication can include a first attribute inserted in the first packet transmitted from the first peer. In further aspects (not shown in this figure) method 300 can also include determining, at the first TURN server, that a third port (e.g., port IP:P2 222) allocated by the symmetric NAT for a second request for communication initiated by the second peer, the second request directed to the TURN VIP, is different from a fourth port (e.g., IP:P2' 223) allocated by the symmetric NAT for a second packet transmitted from the second peer to the first TURN server, based on a second indication; and performing a second mapping of the fourth port to the third port at the first TURN server. The second indication can similarly include a second attribute inserted in the second packet transmitted from the second peer. Accordingly, peer-to-peer communication between the first peer and the second peer can be performed based on the first mapping and the second mapping. In exemplary aspects, the first TURN server can be selected from the first TURN server and a second TURN server by the TURN VIP, based on balancing load at the TURN VIP. Moreover, the first packet and second packet can be Simple Traversal of User Datagram Protocol (STUN) packets.

Accordingly, exemplary aspects also including a system comprising a first peer and a second peer. A symmetric network address translation (NAT) is shared between the first peer and the second peer, the symmetric NAT having wireless isolation enabled and no support for hair-pinning. The system includes means for communicating between the first peer and the second peer based on interactive connectivity establishment (ICE) protocol (e.g., TURN Virtual Internet Platform (VIP) 201 and first Traversal Using Relay NAT (TURN) server-1 202a designated as a relay candidate by TURN VIP 201). The means for communicating can include means for determining that a first port allocated by the symmetric NAT for a first request for communication initiated by the first peer is different from a second port allocated by the symmetric NAT for a first packet transmitted from the first peer, based on a first indication (e.g., TURN server-1 202a, and in some cases, more specifically, a processor or processing means (not explicitly shown) in TURN server-1 202a), and means for performing a first mapping of the second port to the first port (e.g., TURN server-1 202a, and in some cases, more specifically, a processor or processing means (not explicitly shown) in TURN server-1 202a). The means for communicating can further include means for determining that a third port allocated by the symmetric NAT for a second request for communication initiated by the second peer is different from a fourth port allocated by the symmetric NAT for a second packet transmitted from the second peer, based on a second indication (e.g., TURN server-1 202a, and in some cases, more specifically, a processor or processing means (not explicitly shown) in TURN server-1 202a), and means for performing a second mapping of the fourth port to the third port (e.g., TURN server-1 202a, and in some cases, more specifically, a processor or processing means (not explicitly shown) in TURN server-1 202a). Peer-to-peer communication between the first peer and the second peer can be based on the first mapping and the second mapping.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for performing peer-to-peer communication using ICE connections between two peers behind a same symmetrical NAT that has wireless isolation enabled and no support for hair-pinning, in a commercial TURN installation comprising a TURN VIP for balancing load among multiple TURN servers. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of communicating between a first peer and a second peer using interactive connectivity establishment (ICE) protocol, the method comprising:
   sharing a symmetric network address translation (NAT) between the first peer and the second peer, the symmetric NAT having wireless isolation enabled and no support for hair-pinning;
   determining, at a first Traversal Using Relay NAT (TURN) server designated as a relay candidate by a TURN Virtual Internet Platform (VIP), that a first port allocated by the symmetric NAT for a first request for communication initiated by the first peer, the first request directed to the TURN VIP, is different from a second port allocated by the symmetric NAT for a first packet transmitted from the first peer to the first TURN server, based on a first indication; and
   performing a first mapping of the second port to the first port at the first TURN server.

2. The method of claim 1, wherein the first indication comprises a first attribute inserted in the first packet transmitted from the first peer.

3. The method of claim 1, further comprising:
   determining, at the first TURN server, that a third port allocated by the symmetric NAT for a second request for communication initiated by the second peer, the second request directed to the TURN VIP, is different from a fourth port allocated by the symmetric NAT for a second packet transmitted from the second peer to the first TURN server, based on a second indication; and
   performing a second mapping of the fourth port to the third port at the first TURN server.

4. The method of claim 3, wherein the second indication comprises a second attribute inserted in the second packet transmitted from the second peer.

5. The method of claim 3, further comprising, performing peer-to-peer communication between the first peer and the second peer based on the first mapping and the second mapping.

6. The method of claim 3, wherein the first packet and second packet are Simple Traversal of User Datagram Protocol (STUN) packets.

7. The method of claim 1, wherein the first TURN server is selected from the first TURN server and a second TURN server by the TURN VIP, based on balancing load at the TURN VIP.

8. A communication system comprising:
   a first peer;
   a second peer, wherein at least one of the first peer or the second peer comprises a processor and a memory;
   a symmetric network address translation (NAT) shared between the first peer and the second peer, the symmetric NAT having wireless isolation enabled and no support for hair-pinning;
   a TURN Virtual Internet Platform (VIP);
   a first Traversal Using Relay NAT (TURN) server designated as a relay candidate by the TURN Virtual Internet Platform (VIP), the first TURN server configured to:
      determine that a first port allocated by the symmetric NAT for a first request for communication initiated by the first peer, the first request directed to the TURN VIP, is different from a second port allocated by the symmetric NAT for a first packet transmitted from the first peer to the first TURN server, based on a first indication; and
      perform a first mapping of the second port to the first port.

9. The communication system of claim 8, wherein the first indication comprises a first attribute inserted in the first packet transmitted from the first peer.

10. The communication system of claim 8, wherein the first TURN server is further configured to:
    determine that a third port allocated by the symmetric NAT for a second request for communication initiated by the second peer, the second request directed to the TURN VIP, is different from a fourth port allocated by the symmetric NAT for a second packet transmitted from the second peer to the first TURN server, based on a second indication; and
    perform a second mapping of the fourth port to the third port.

11. The communication system of claim 10, wherein the second indication comprises a second attribute inserted in the second packet transmitted from the second peer.

12. The communication system of claim 10, wherein the first TURN server is configured to enable peer-to-peer communication between the first peer and the second peer based on the first mapping and the second mapping, the peer-to-peer communication based on interactive connectivity establishment (ICE) protocol.

13. The communication system of claim 10, wherein the first packet and second packet are Simple Traversal of User Datagram Protocol (STUN) packets.

14. The communication system of claim 8, wherein the first TURN server is selected from the first TURN server and a second TURN server by the TURN VIP, based on load at the TURN VIP.

15. A system comprising:
    a first peer;
    a second peer;
    a symmetric network address translation (NAT) shared between the first peer and the second peer, the symmetric NAT having wireless isolation enabled and no support for hair-pinning;
    means for communicating between the first peer and the second peer based on interactive connectivity establishment (ICE) protocol, the means for communicating comprising:
       means for determining that a first port allocated by the symmetric NAT for a first request for communication initiated by the first peer is different from a second port allocated by the symmetric NAT for a first packet transmitted from the first peer, based on a first indication; and
       means for performing a first mapping of the second port to the first port.

16. The system of claim 15, wherein the means for communicating further comprises:
- means for determining that a third port allocated by the symmetric NAT for a second request for communication initiated by the second peer is different from a fourth port allocated by the symmetric NAT for a second packet transmitted from the second peer, based on a second indication; and
- means for performing a second mapping of the fourth port to the third port.

* * * * *